United States Patent Office
2,949,458
Patented Aug. 16, 1960

2,949,458

CERTAIN 1,3-DIPHENYL-THIOPARABANIC ACIDS

Renat Herbert Mizzoni, Long Valley, N.J., assignor to Ciba Pharmaceutical Products, Inc., Summit, N.J., a corporation of New Jersey No Drawing. Filed Nov. 28, 1958, Ser. No. 776,756

2 Claims. (Cl. 260—240)

This invention relates to a new series of 2-thioparabanic acid derivatives. More particularly, it concerns 1,3-diphenyl-2-thioparabanic acids, in which each of the phenyl radicals contains in the 4-position a group of the formula Py—(CH=CH)$_n$—, in which Py stands for a pyridyl radical and $n$ stands for a whole number from 1 to 2, and the salts thereof, as well as process for the preparation thereof.

The pyridyl radical in the above-mentioned substituent stands for 3-pyridyl, 4-pyridyl, or especially 2-pyridyl radicals, which radicals may contain as additional substituents lower alkyl, e.g. methyl or ethyl; nitro or amino groups, or halogen, e.g. chlorine or bromine, atoms.

Salts of the new 2-thioparabanic acid derivatives are therapeutically acceptable acid addition salts, for example, those with inorganic acids, such as hydrohalic acids, e.g. hydrochloric or hydrobromic acid; sulfuric or phosphoric acids; or those with strong organic acids, such as acetic, glycolic, methane sulfonic, ethane sulfonic or hydroxyethane sulfonic acid.

It has been found that the new compounds of this invention and the salts thereof inhibit the growth of different types of Mycobacteria, such as *Mycobacterium tuberculosis*, e.g. the human pathogenic strain H 37 Rv of *Mycobacterium tuberculosis*, or *Mycobacterium leprae*, and may therefore be used as tuberculostatic and leprostatic agents. For example, a good tuberculostatic effect is obtained with 1,3-diphenyl-2-thioparabanic acids, in which each of the phenyl radicals contains in the 4-position a 2-(2-pyridyl)-ethenyl group.

The new compounds of this invention may be used as tuberculostatic or leprostatic agents in the form of pharmaceutical preparations, which contain the new compounds or salts thereof in admixture with a pharmaceutical organic or inorganic, solid or liquid carrier suitable for enteral, e.g. oral, or parenteral administration. For making up the preparations there can be employed substances which do not react with the new compounds, such as water, gelatine, lactose, starches, stearic acid, magnesium stearate, stearyl alcohol, talc, vegetable oils, benzyl alcohols, gums, waxes, polyalkylene glycols, petroleum jelly or any other known carrier for medicaments. The pharmaceutical preparations may be in solid form, for example, as tablets, dragees or capsules or in liquid form, for example, as solutions or emulsions. If desired, they may contain auxiliary substances, such as preserving agents, stabilizing agents, wetting or emulsifying agents, salts for varying the osmotic pressure or buffers. They may also contain, in combination, other therapeutically useful substances, particularly other antitubercular agents, such as, for example, 4-aminosalicylic acid, isonicotinic acid hydrazide, streptomycin or dihydrostreptomycin, or antileprotic agents, for example, sulfones, e.g. thiazol-sulfone.

The new 2-thioparabanic acid derivatives of this invention may be prepared by treating a 1,3-diphenyl-2-thiourea, in which each of the phenyl radicals contains in the 4-position a group of the formula Py—(CH=CH)$_n$—, in which Py and $n$ have the above-given meaning, with oxalic acid, preferably in the form of a reactive functional derivative thereof, and, if desired, converting a resulting salt into the free base, and/or, if desired, converting resulting base into the salt thereof.

Functional derivatives of oxalic acid, which are capable of reacting with a 2-thiourea compound to form the desired 2-thioparabanic acid derivatives, are especially oxalyl halides, primarily oxalyl chloride. These reagents are preferably used in the presence of a non-hydroxylated solvent, such as, hydrocarbons, e.g. hexane, benzene or toluene; ethers, e.g. dioxane or 1,2-dimethoxy-ethane; or halogenated hydrocarbons, e.g. methylene chloride, chloroform, carbon tetrachloride or ethylene chloride. Another functional derivative of oxalic acid to be used in the above reaction is cyanogen. A solution, preferably a lower alkanol, e.g. methanol, ethanol or propanol, solution of the 2-thiourea compound is treated with the gaseous cyanogen and the resulting reaction product is then hydrolyzed, preferably with an aqueous inorganic acid, e.g. hydrochloric, hydrobromic or sulfuric acid, to form the desired 2-thioparabanic acid compound.

The 1,3-diphenyl-2-thioureas used as the starting materials may be prepared according to methods used for the preparation of known thioureas. Thus, a symmetrically substituted 1,3-diphenyl-thiourea may be prepared by reacting an appropriately substituted aniline with thiophosgene or carbon disulfide; for example, 4-[2-(2-pyridyl)-ethenyl]-aniline, when reacted with carbon disulfide in the presence of potassium ethyl xanthate, forms 1,3-bis-{4- 2-(2-pyridyl)-ethyl]-phenyl}-2-thiourea. Asymmetrically substituted 1,3-diphenyl-2-thioureas may be prepared by reacting substituted phenylisothiocyanates with substituted anilines. These thioureas may also be used in the form of their acid addition salts.

Depending on the conditions used, the new compounds may be obtained in the form of the free bases or salts thereof. A salt may be converted into the free base in the customary way, for example, by treatment with an aqueous alkaline medium, such as an alkali metal hydroxide, e.g. sodium carbonate or potassium hydrogen carbonate; or ammonia. A free base may be transformed into its therapeutically acceptable acid addition salts by reaction with appropriate inorganic or organic acids, such as those outlined above, for example, in a lower alkanol, e.g. methanol, ethanol, propanol or isopropanol, solution. A reaction product may also be obtained in the form of a hydrate; mono- or poly-salts may be formed.

The following example is intended to illustrate the invention, and is not to be construed as being a limitation thereon. Temperatures are given in degrees Centigrade.

*Example*

A solution of 19.7 g. of 1,3-bis-{4-[2-(2-pyridyl)-ethenyl]-phenyl}-2-thiourea in 150 ml. of chloroform is heated to reflux and 6.4 g. of oxalyl chloride in 25 ml. of chloroform is added over a period of five minutes while stirring. After refluxing for 1½ hours and cooling, a precipitate is formed which is filtered off and recrystallized from a mixture of methanol and water to yield the 1,3-bis-{4-[2-(2-pyridyl)-ethenyl]-phenyl}-2-thioparabanic acid.

The hydrochloride is prepared by treating the base in ethanol with hydrogen chloride and precipitating the salt by adding ether.

The starting material may be prepared as follows: A solution of 15.7 g. of 4-[2-(2-pyridyl)-ethenyl]-aniline, 7.6 g. of carbon disulfide and 0.1 g. of potassium ethyl xanthate in 100 ml. of methanol is refluxed for two hours. A precipitate is formed after about 1½ hours, which is filtered off after cooling. The resulting 1,3-bis-{4-[2-(2- pyridyl)-ethenyl]-phenyl}-2-thiourea is recrystallized from a mixture of chloroform and petroleum ether, M.P. 190–192°.

The 1-{4-[2-(4-pyridyl)-ethenyl]-phenyl}-3-{4-[2-(2-pyridyl)-ethenyl]-phenyl}-2-thioparabanic acid hydrochloride may be obtained by reacting 1-{4-[2-(4-pyridyl)-ethenyl]-phenyl}-3-{4-[2-(2-pyridyl)-ethenyl]-phenyl}-2-thiourea, prepared from 4-[2-(2-pyridyl)-ethenyl]-phenylisothiocyanate and 4-[2-(4-pyridyl)-ethenyl]-aniline, with oxalyl chloride according to the procedure disclosed hereinbefore. The reaction of 1,3-bis-{4-[4-(2-pyridyl)-butadienyl]-phenyl}-2-thiourea with oxalyl chloride yields the 1,3-bis-{4-[4-(2-pyridyl)-butadienyl]-phenyl}-2-thioparabanic acid hydrochloride.

What is claimed is:

1. A member of the group consisting of 1,3-diphenyl-2-thioparabanic acid, in which each of the phenyl radicals is substituted in the 4-position by the group of the formula Py—$(CH=CH)_n$—, in which Py stands for a member of the group consisting of 2-pyridyl, 3-pyridyl and 4-pyridyl, and $n$ for a whole number from 1 to 2, and therapeutically acceptable acid addition salts thereof.

2. 1,3-bis-{4-[2-(2-pyridyl)-ethenyl] - phenyl} - 2-thioparabanic acid.

References Cited in the file of this patent

Bilz: Berichte Deutsche Chemische Gessellschaft, vol. 46, page 1404 (1931).

Beilstein: Handbuch der Organische Chemie, vol. 24, p. 407 (System #3614), 1936 (Band XXIII/XXV).

UNITED STATES PATENT OFFICE
CERTIFICATION OF CORRECTION

Patent No. 2,949,458            August 16, 1960

Renat Herbert Mizzoni

It is hereby certified that error appears in the above numbered patent requiring correction and that the said Letters Patent should read as corrected below.

Column 2, line 32, for "{4- 2-(2-pyridyl)-ethyl]-phenyl}-2-thiourea" read
-- {4-[2-(2-pyridyl)-ethenyl]-phenyl}-2-thiourea --.

Signed and sealed this 6th day of June 1961.

(SEAL)
Attest:

ERNEST W. SWIDER
Attesting Officer

DAVID L. LADD
Commissioner of Patents